United States Patent
Parhi et al.

(10) Patent No.: US 11,914,651 B2
(45) Date of Patent: Feb. 27, 2024

(54) CLASSIFICATION AND SELECTIVE FILTERING OF A DATA SET

(71) Applicant: International Business Machines Corporation, Armonk, NY (US)

(72) Inventors: Prabhuranjan Parhi, Visakhapatnam (IN); Mohan Gopal Meher, Sonepur (IN); Utpal Kanti Patra, Visakhapatnam (IN); Jyothi Jaggumahantri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 16/675,327

(22) Filed: Nov. 6, 2019

(65) Prior Publication Data
US 2021/0133249 A1 May 6, 2021

(51) Int. Cl.
*G06F 16/90* (2019.01)
*G06F 16/9035* (2019.01)
*G06F 16/906* (2019.01)

(52) U.S. Cl.
CPC ........ *G06F 16/9035* (2019.01); *G06F 16/906* (2019.01)

(58) Field of Classification Search
CPC ............................ G06F 16/9035; G06F 16/906
See application file for complete search history.

(56) References Cited

U.S. PATENT DOCUMENTS

| | | | |
|---|---|---|---|
| 8,719,408 B2 | 5/2014 | Carter | |
| 9,569,549 B1* | 2/2017 | Jenkins | .................. G06F 16/29 |
| 2013/0290110 A1* | 10/2013 | LuVogt | .................. G06Q 30/02 |
| | | | 705/14.66 |
| 2017/0012929 A1 | 1/2017 | Shah | |
| 2017/0171137 A1 | 6/2017 | Akavaram | |
| 2018/0232641 A1* | 8/2018 | Bostick | ................. H04L 67/306 |
| 2019/0104342 A1 | 4/2019 | Catalano | |

OTHER PUBLICATIONS

"A creative method to show social network contents in a more useful way", An IP.com Prior Art Database Technical Disclosure, Authors et. al.: Disclosed Anonymously, IP.com No. IPCOM000252491D, IP.com Electronic Publication Date: Jan. 18, 2018, 4 pages.

Mell et al., "The NIST Definition of Cloud Computing", Recommendations of the National Institute of Standards and Technology, Special Publication 800-145, Sep. 2011, 7 pages.

* cited by examiner

*Primary Examiner* — Kristopher Andersen
(74) *Attorney, Agent, or Firm* — David K. Mattheis

(57) ABSTRACT

Classifying and filtering data by categorizing a portion of a data segment according to the content of the portion, correlating each portion with a user content preference dictionary, assigning a content weight to each portion according to the correlation, and masking content portions having a weight below a threshold value.

20 Claims, 4 Drawing Sheets

US 11,914,651 B2

CLASSIFICATION AND SELECTIVE FILTERING OF A DATA SET

BACKGROUND

The disclosure relates generally to the review, classification and filtering of data sets. The disclosure relates particularly to filtering data sets for presentation to a user according to automatic data content classification and user preferences.

Social media systems, and the internet in general, connect users to vast amounts of data. The available data may be categorized and classified in any number of ways, according to innumerable classification dimensions. Individual pieces of data may be linked according to these classification dimensions. Users are unique and have individualized needs and tastes in terms of the data they are willing to spend time reviewing.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the classification and filtering of user consumable data sets.

Aspects of the invention disclose methods, systems and computer readable media associated with classifying and filtering data by categorizing a portion of a data segment according to the content of the portion, correlating each portion with a user content preference dictionary, assigning a content weight to each portion according to the correlation, and masking content portions having a weight below a threshold value.

Aspects of the invention disclose methods, systems and computer readable media associated with classifying and filtering data by categorizing a portion of a data segment according to the content of the portion, presenting data associated with a new content category to a user, updating a user content preference dictionary according to user activity associated with the new content category, correlating each portion with the user content preference dictionary, assigning a content weight to each portion according to the correlation, and masking content portions having a weight below a threshold value.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
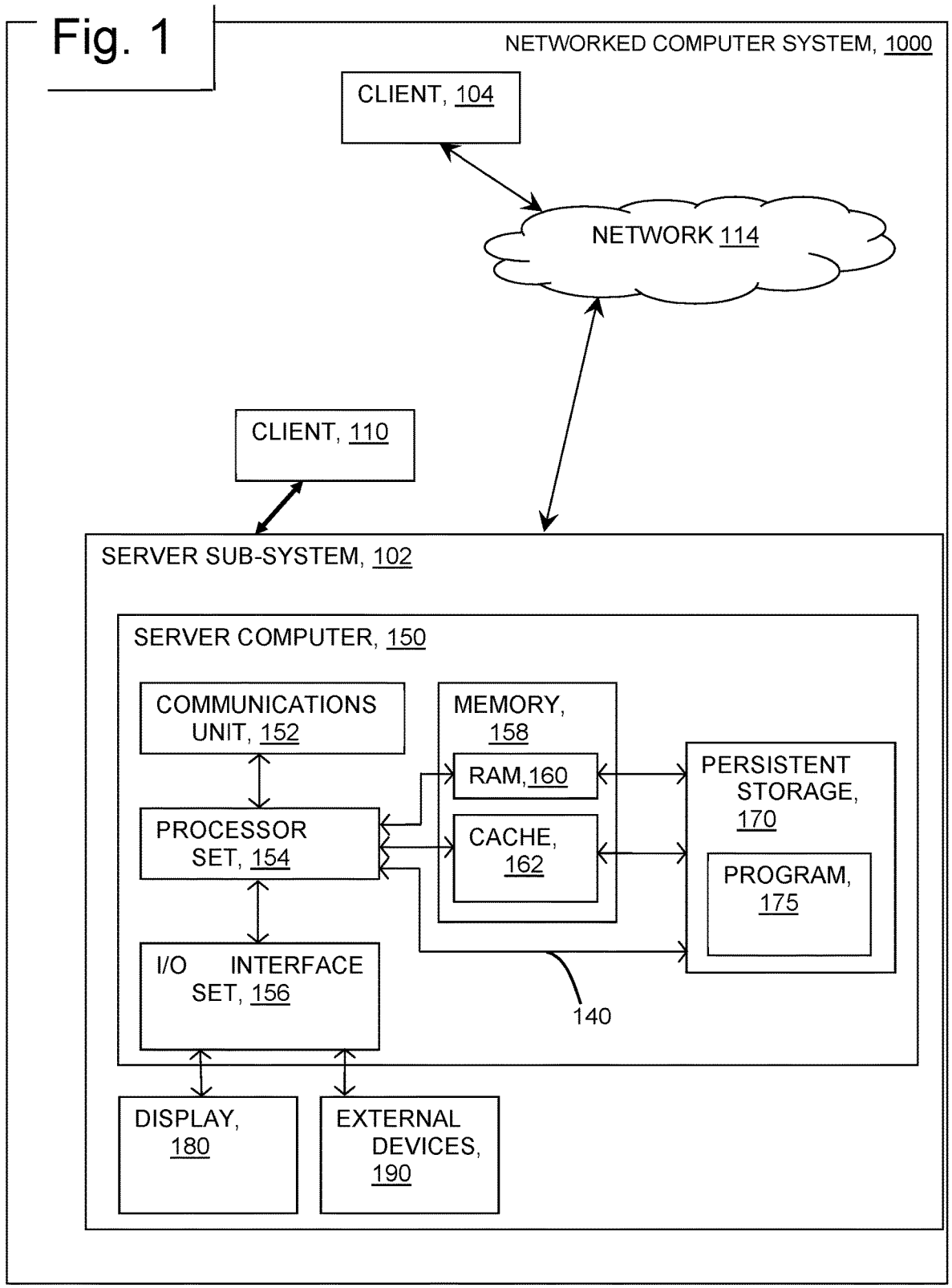
FIG. 1 provides a schematic illustration of a system, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., categorizing data according to content, correlating content to a user content reference dictionary masking low priority content, etc.). These solutions are not abstract and cannot be performed as a set of mental acts by a human due to the processing capabilities needed to analyze and weight data content, for example. Further, some of the processes performed may be performed by a specialized computer for carrying out defined tasks related to memory operations. For example, a specialized computer can be employed to carry out tasks related to subdividing data segments into portions according to content, weighting the portions according to user preferences, masking low priority—poorly weighted portions—during content presentation, or the like. Such selective content presentation—with portion of low interest pre-screened and masked from view, reduces the time needed to view the data segment as only high value portions of the segment are actually viewed. The time and computing resources available to a user are thus spent on high value content and not screening data segments for the high value content.

Social media networks afford users access to vast amounts of data, as does the internet in general. User have finite amounts of time to spend perusing data from the internet and social media systems. Users typically have defined interests, likes and dislikes, which can be expressed in view of the content of available data. Some data is of interest and some data is not. Time and computing resources spent on the presentation of data which is of no interest to the user is not only wasted but carries the additional effect of reducing time and computing resources available for presenting data of actual interest to the user and other system processing tasks. What is needed is a system and method to filter available data and mask data which is of no interest to a user, freeing system resources to present only data of interest and reducing or eliminating any need to present unwanted data, thereby increasing system resource efficiency by applying resources to high priority tasks.

In an embodiment, the method initializes the system of the invention. In this embodiment, the user creates an account and logs on to the system. In some embodiments, the system collects user preference information regarding like/dislikes associated with broad content categories—sports, entertainment, science and technology, political news, world events, etc. The system also collects, with permission from the user, demographic information regarding the user, geographic location, preferred language, user age, gender, etc. In this embodiment, the method of the invention builds a user profile containing user preferences and other collected data. In an embodiment, the method uses the user profile to associate a user with other users having similar profile dimensions, again, with appropriate user permission.

In an embodiment, the method collects social media information associated with the user, networks used, login information, etc., in order to enable the user to access social media networks through the system and method of the invention. In an embodiment, the method further collects on-line subscription accounts associated with the user to enable access to on-line data to which the user subscribes.

In an embodiment, the method collects user preferences regarding the extent of application of the methods to the users browsing and networking activities. In some embodiments, the method collects user preferences regarding applying the method to private group chat exchanges, direct message exchanges, and public group data exchanges, site comment sections, etc.

In an embodiment, the method builds a user content preference dictionary specific to each user. The dictionary includes the users content preferences. The method associates initial dictionary entries with the content preference collected from the user during the initialization of the system. In an embodiment, the method creates and maintains the user content preference dictionary locally on a user device. In an embodiment, the method creates and maintains the dictionary in a networked location such as cloud or edge cloud resources and is accessible by a user by way of a network connection. In this embodiment, the user accesses content using the method and the dictionary entry from mobile devices, smart phones, tablets, portable computers, etc., as well as fixed devices such as desktop computers.

Over time, as the user accesses data content via the methods and systems of embodiments of the invention, the methods modify and update the user content preference dictionary entry of the user. In some embodiments, the user provides additional direct input regarding content categories in response to system prompts, or more directly by accessing the dictionary entry and altering settings associated with data content categories. In some embodiments the method updates and modifies the dictionary entry automatically according to user activity in response to presented content.

In an embodiment, the method scans all content, whether originating from a social media feed, direct news feed, or general internet browsing activity, prior to presentation to the user. In this embodiment, the method analyzes the content using machine learning models, such as classification neural network models trained using image, video and textual data associated with differing content categories. In an embodiment, the machine learning models utilize natural language processing (NLP) algorithms to analyze the content and assign category designation(s) to the content. In an embodiment, the method subdivides the content segment into content portions according to content categories. In this embodiment, a content segment contains several portions, each portion associated with a unique and different category. For example, a world news video contains an embedded advertisement—a different category from that of world news itself. For this example, the method divides the segment into multiple portions, world news before the advertisement, the advertisement, and world news after the advertisement. The method assigns the first and third portions to the word news category—with possible sub-category assignments as well according to the world location and nature of the news—sports, entertainment, political, weather, etc.,—and assigns the advertisement to the advertisement category—with possible sub-categorization regarding the product or service advertised. As a further example, the method sub-divides sports news in general into sub-categories according to sport (baseball, football, golf, tennis, hockey, soccer, etc.), gender (men's, women's), level (professional, college, high school, amateur), regular season vs playoff season, etc. The method translates each sub-categorization identified by the NLP and classification neural network into an entry in the user's content preference dictionary.

As a further example, the method subdivides entertainment news into subcategories according to music, television and movie news as well as subcategories according recent and upcoming performance and individual performing artists and content genres. The method again translates each sub-categorization identified by the NLP and classification neural network into an entry in the user's content preference dictionary.

As a further example, the method evaluates science and technology content, subcategorizing the data segments according to field of study, recent developments, and researcher. The method translates each sub-categorization identified by the NLP and classification neural network into an entry in the user's content preference dictionary.

In an embodiment, the analysis of the content yields a set of metadata associated with the portions and overall segment of content. In this embodiment, the analysis metadata includes the percent each portion represents of the overall segment, the start and end points for each portion, (start time and end time for video, first line and last line for text). In this embodiment, the method then evaluates the metadata of the portions as a set to determine what, if anything will be presented to the user.

In an embodiment, the method evaluates the metadata of the set of content portions of each data segment according to the user's content preference dictionary entry. In this embodiment, the method presents content portions associated with categories having no corresponding entry in the user's content preference dictionary to the user, together with a user input prompt requesting a user preference. In this embodiment, the user input prompt requests, from the user, a preference selection for the new content category. As an example, the method provides a prompt asking the user to accept or decline presentation of the content portion according to the categorization of the content: "Would you like to see a video of the week's baseball highlights?". The method then initializes a new entry in the user's content preference dictionary for the new category using the user input response to the request. The method assigns weights to all other content portions according to the user's content preference dictionary category and sub-category definitions. The method assigns high weights to content portions associated with preferred preference ratings according to the dictionary. The method assigns low weights to content portions which are not preferred by the user according to the dictionary.

In an embodiment, the method captures user activity as data segments and portions are presented. In this embodiment, the method tracks user activity including deleting, minimizing, or hiding the content, the time the user spends reading an article or viewing an image/video, images, article, or videos which the user copies or downloads, images within an album of images which the user views, the time the user spends viewing the image and any images, videos, articles, or other content the user likes, dislikes, upvotes, or downvotes after viewing the content, and any content the user shares across their social media network or by email or direct messaging applications.

In an embodiment, the method initializes each category with a nominal value on a scale of 0 to 100, for example the method assigns a value of 50 to each category. In this embodiment, the method collects user preference data as direct inputs and alters the values accordingly. For example, the method alters the preference value of categories which the user rejects in the initiation of the user content preference dictionary, from 50 to 0. In this embodiment, the method maintains all categories the user prefers at a value of 50. Over time, the method raises or lowers the values of preferred categories according to the monitored user activity. Activities indicating a user preference for a category result in a positive alteration of the value by a preset amount, e.g., an increase of 1 for each positive activity. Activities indicating refusal or rejection of the content category result in a reduction by a preset amount, e.g., decreasing the value by 1 for each such activity.

In an embodiment, the method continuously updates the user's content preference dictionary as user activity occurs. As an example, a user may have an initial generalized preference for sports news, the method assigns sports news a nominal value of 50. Over time, the method presents multiple sports news content portions having a variety of sub-categorizations, including football, tennis, auto racing, golf, baseball, basketball, hockey, soccer, men's, women's, professional, college, as well as portions associated with specific teams and athletes. Based upon user activity associated with the broad collection of sports news, the method generates new elevated positive values for sports news associated with the user's favorite baseball team, fantasy sports league players, playoff news for football, baseball, basketball, hockey, and world cup soccer. The method concurrently diminishes the values associated with tennis, auto racing, golf, teams other than the user's favorite and players other than the user's selections. Similarly, the method lowers the values associated with entertainment portions associated with genres, performers and entertainment types not favored by aa user, resulting in such items no longer being presented from an overall entertainment data segment.

In an embodiment, after categorizing each content portion, the method assigns weights to each portion according to the corresponding user content preference dictionary. In this embodiment, as sub-categorization values change, the content presented to the user also changes. The method ceases to present content from sub-categorizations having low or falling weight values. The method gradually drops updates related to golf tournaments, non-playoff games for teams other than the user's favorite, and all other non-preferred sports news from the sports category content being presented to the user.

In an embodiment, a threshold value is defined, the method presents only content having a weight above the threshold value. As an example, a threshold value of 30 on the 0 to 100 scale is set. In an embodiment, the user sets the threshold value. In an embodiment, an initial threshold value is set, and the model evaluates the initial value in terms of user activities. Negative user activities for defined category and subcategory content weighted at or near the threshold leads the method to raise the threshold value.

In an embodiment, content is ranked and ordered according to the assigned weight values, from highest to lowest weights. In this embodiment, the content is then presented to the user beginning with the highest weighted content and ending with the lowest non-zero weighted content or ending with the lowest weighted content having the threshold level weight.

In an embodiment, content is presented according to category and then according to sub-category according to weight. In this embodiment, the content associated with a highest ranked main category is all presented first, from highest to lowest weight based on sub-category weighting, then the next highest ranked main category of content is presented and so on.

In an embodiment, content having a low, below threshold or zero weighting is considered masked content, such content is not presented to the user. For segments including high weight value content portions as well as low or zero weighted portions, the segment is presented while skipping the low or zero weighted masked content. As an example, a video includes a zero-rated portion from time stamp 1:03 to time stamp 1:57, in this embodiment the method presents the portion from 0:00 to 1:03, and then presents the portion from 1:57 to the end of the segment, skipping the low or zero-rated portion.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise data content classification and filtering program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the data content classification and filtering program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards.

Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., data content classification and filtering program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
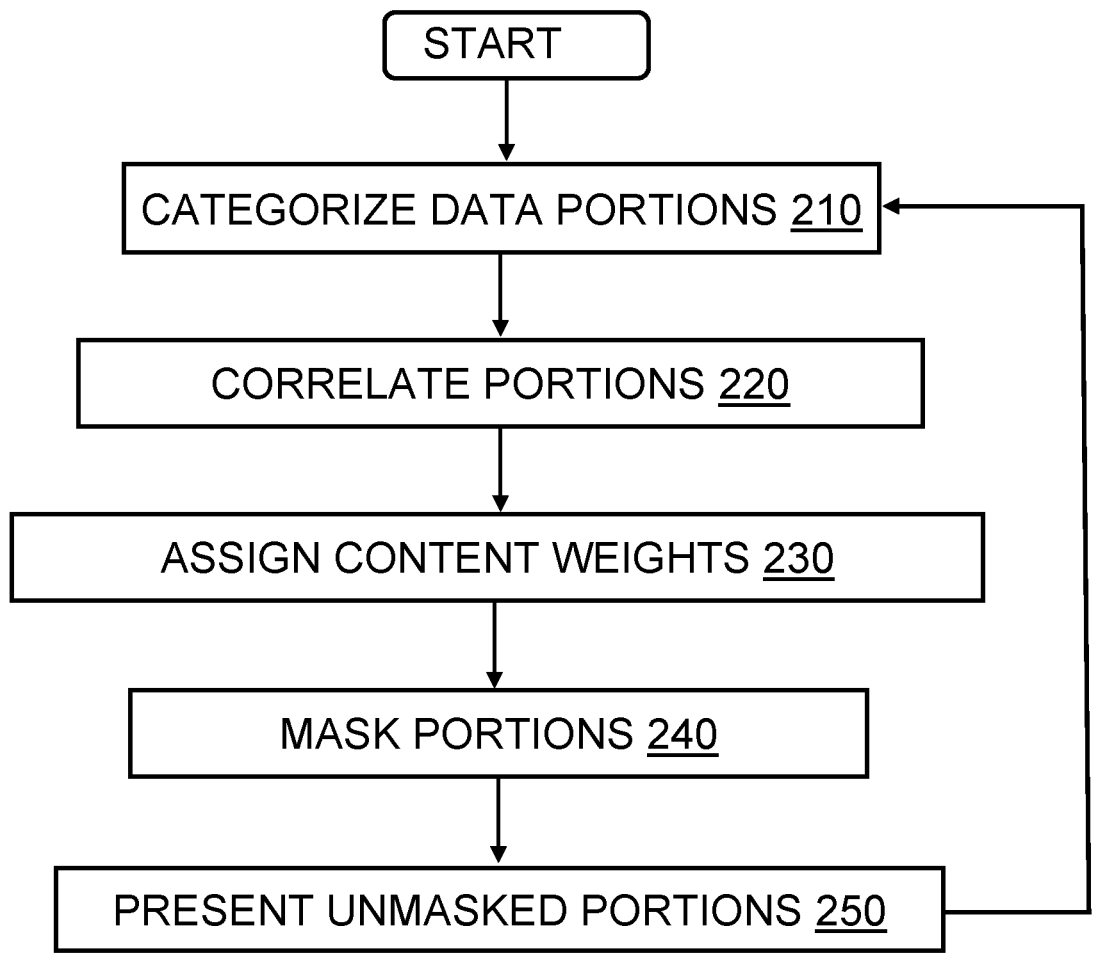
FIG. 2 provides a flowchart depicting an operational sequence, according to an embodiment of the invention.

FIG. 2 provides a flowchart 200, illustrating exemplary activities associated with the practice of the disclosure. As illustrated in the figure, at 210, the method of data content classification and filtering program 175, categorizes data segment portions. The method receives data segments from the user's social media, subscription data services, email and messaging applications and general internet browsing activities. Program 175 categorizes the data using trained machine learning models including classification neural networks and NLP algorithms. Program 175 subdivides data segments into portions according to content categories and sub-categories defined by the models and NLP algorithms. At 220, program 175 correlates the categorized portions with entries in the user's defined content preference dictionary according to their assigned category. At 230, program 175 assigns weights to the content portions according to the correlated entries in the dictionary. Program 175 monitors user activity and updates the weights associated with dictionary category and sub-category entries. Positive user activity—user dwell time while reading or viewing, liking content, sharing content, upvoting, etc., result in increased weight values. Hiding, deleting, disliking, downvoting, etc., result in lowered weights. The method also uses direct user input—selections made while initiating the system, and manually entered preferences, to adjust category and sub-category weight values.

At 240, program 175 masks content portions having low weights or zero value weights. In this embodiment, program 175 does not present masked content to the user. In an embodiment, the method defines a threshold weight value below which the method masks all content. In an embodiment, the method monitors user behavior and adjusts the threshold according to user behavior related to content at or near the threshold value. At 250, program 175 present content to the user according to the weighted values of the content. The method presents highly weighted categories before lower weighted categories and highly weighted sub-category content before lower weighted sub-category content. Program 175 is iterative and continuously evaluates new content streaming toward the user, categorizing, correlating, weighting, masking low weight content, and presenting content with a sufficiently high weighting value to the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
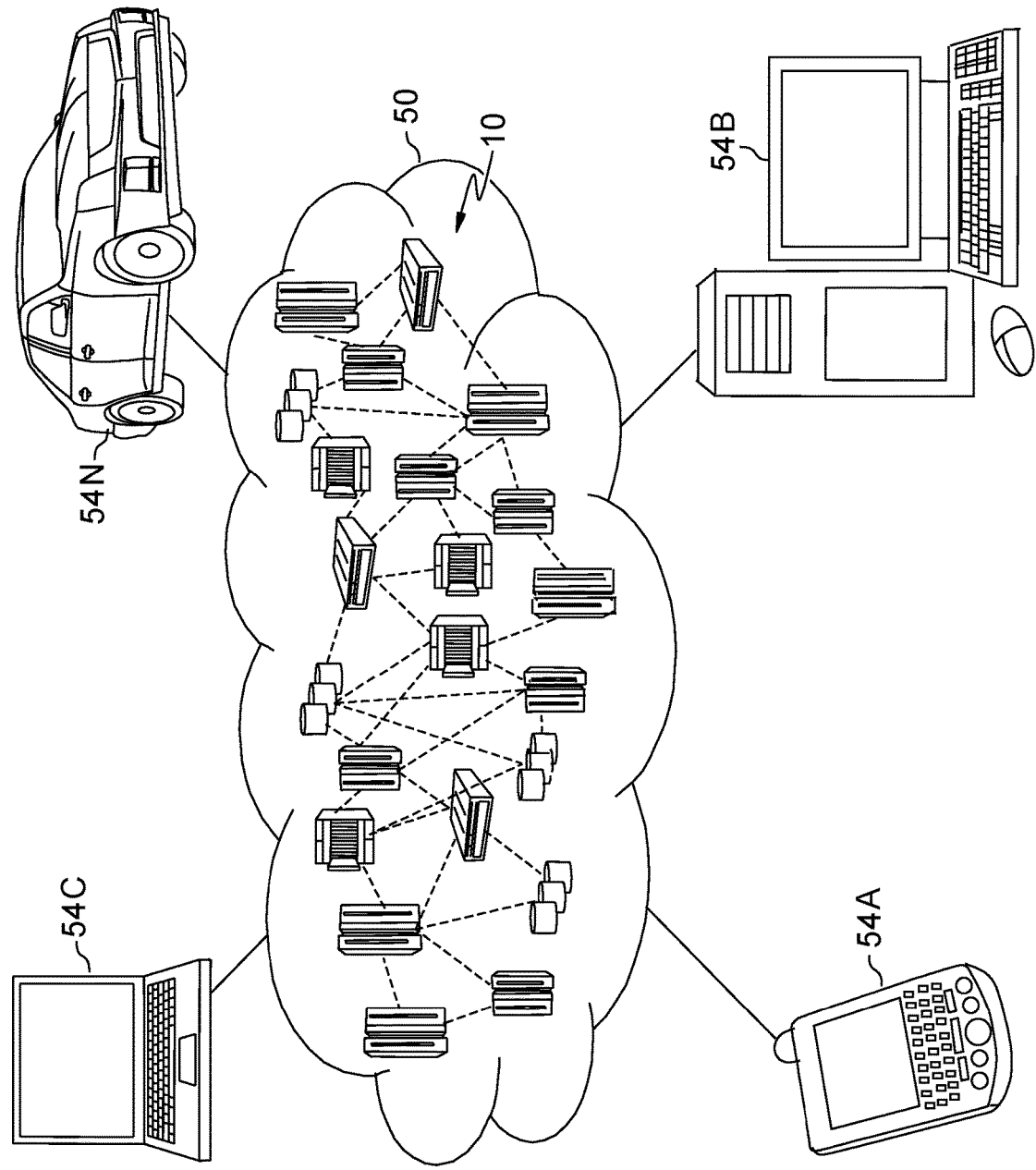
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
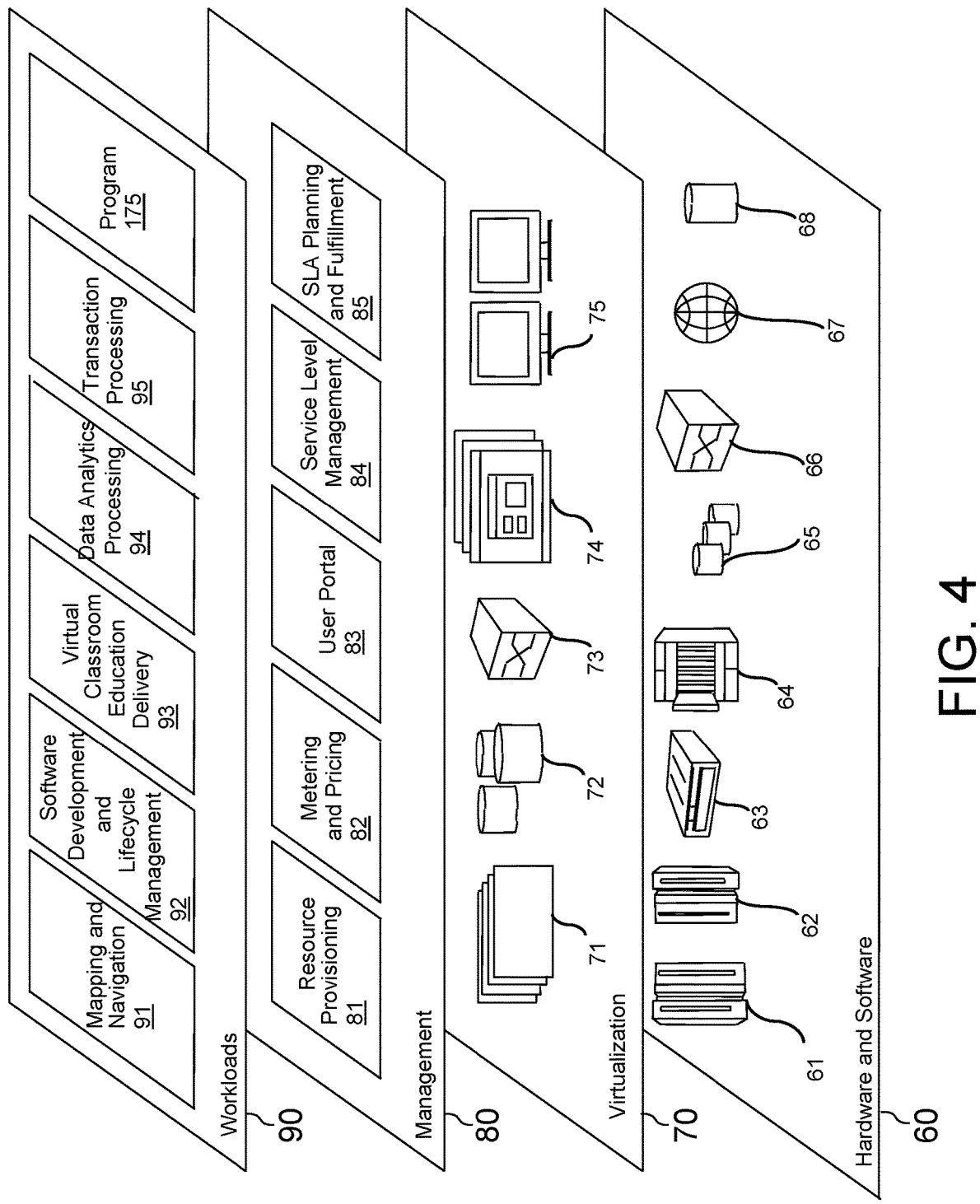
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data content classification and filtering program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for classifying and filtering data, the method comprising:
    training a classification neural network model using data associated with different content categories;
    categorizing, by one or more computer processors using the classification neural network model, a portion of a data segment according to content of the portion to identify a category;
    translating, by the one or more computer processors, the category into an entry in a user content preference dictionary;
    correlating, by the one or more computer processors, the portion with the user content preference dictionary;
    assigning, by the one or more computer processors, a content weight to the portion according to correlated entries in the user content preference dictionary;
    setting a threshold value for the category;
    determining, by the one or more computer processors, that the content weight falls below the threshold value, or falls at or above the threshold value;
    masking from presentation, by the one or more computer processors, the portion having a content weight below a threshold value;
    presenting the portion having a content weight at or above the threshold value upon a display;
    adjusting the threshold value according to user activities yielding an adjusted threshold value for the category; and
    presenting a portion having a content weight at or above the adjusted threshold value upon the display.

2. The computer implemented method according to claim 1, further comprising updating, by the one or more computer processors, the user content preference dictionary according to user activity.

3. The computer implemented method according to claim 2, wherein the user activity is selected from a group consisting of: hiding or deleting a data portion, article read time, video viewing time, downloaded content, liking or disliking portions, upvoting or downvoting content, viewing portions, and sharing portions.

4. The computer implemented method according to claim 1, further comprising ordering, by the one or more computer processors, the portion for presentation according to the content weight.

5. The computer implemented method according to claim 1, further comprising masking, by the one or more computer processors, all data having a zero weight.

6. The computer implemented method according to claim 1, further comprising:
    categorizing, by the one or more computer processors, a first portion as new;
    requesting, by the one or more computer processors, user input regarding a content category of the first portion;
    receiving, by the one or more computer processors, a user response; and
    updating, by the one or more computer processors, the user content preference dictionary according to the user response.

7. The computer implemented method according to claim 1, wherein the user content preference dictionary includes user provided content preferences.

8. A computer program product for classifying and filtering data, the computer program product comprising one or more computer readable storage media and stored program instructions on the one or more computer readable storage media, the stored program instructions comprising:
    program instructions to train a classification neural network model using data associated with different content categories;
    program instructions to use the classification neural network model to categorize a portion of a data segment according to content of the portion to identify a category;
    program instructions to translate the category into an entry in a user content preference dictionary;
    program instructions to correlate the portion with the user content preference dictionary;
    program instructions to assign a content weight to the portion according to correlated entries in the user content preference dictionary;
    program instructions to set a threshold value for the category;
    program instructions to determine that the content weight falls below the threshold value, or falls at or above the threshold value;
    program instructions to mask from presentation, the portion having a content weight below a threshold value;
    program instructions to present the portion having a content weight at or above the threshold value upon a display;
    program instructions to adjust the threshold value according to user activities yielding an adjusted threshold value for the category; and
    program instructions to present a portion having a content weight at or above the adjusted threshold value upon the display.

9. The computer program product according to claim 8, further comprising program instructions to update the user content preference dictionary according to user activity.

10. The computer program product according to claim 9, wherein the user activity is selected from a group consisting of: hiding or deleting a data portion, article read time, video viewing time, downloaded content, liking or disliking portions, upvoting or downvoting content, viewing portions, and sharing portions.

11. The computer program product according to claim 8, further comprising ordering the portion for presentation according to the content weight.

12. The computer program product according to claim 8, further comprising masking all data having a zero weight.

13. The computer program product according to claim 8, further comprising:
    program instructions to categorize a first portion as new;
    program instructions to request user input regarding a content category of the first portion;
    program instructions to receive a user response; and
    program instructions to update the user content preference dictionary according to the user response.

14. The computer program product according to claim 8, wherein the user content preference dictionary includes user provided content preferences.

15. A computer system for classifying and filtering data, the computer system comprising:
   one or more computer processors;
   one or more computer readable storage media; and
   stored program instructions on the one or more computer readable storage media for execution by the one or more computer processors, the stored program instructions comprising:
   program instructions to train a classification neural network model using data associated with different content categories;
   program instructions to use the classification neural network model to categorize a portion of a data segment according to content of the portion to identify a category;
   program instructions to translate the category into an entry in a user content preference dictionary;
   program instructions to correlate the portion with the user content preference dictionary;
   program instructions to assign a content weight to the portion according to correlated entries in the user content preference dictionary;
   program instructions to set a threshold value for the category;
   program instructions to determine that the content weight falls below the threshold value, or falls at or above the threshold value; program instructions to mask from presentation, the portion having a content weight below a threshold value;
   program instructions to present the portion having a content weight at or above the threshold value upon a display;
   program instructions to adjust the threshold value according to user activities yielding an adjusted threshold value for the category; and
   program instructions to present a portion having a content weight at or above the adjusted threshold value upon the display.

16. The computer system according to claim 15, further comprising program instructions to update the user content preference dictionary according to user activity.

17. The computer system according to claim 16, wherein the user activity is selected from a group consisting of: hiding or deleting a data portion, article read time, video viewing time, downloaded content, liking or disliking portions, upvoting or downvoting content, viewing portions, and sharing portions.

18. The computer system according to claim 15, further comprising ordering the portion for presentation according to the content weight.

19. The computer system according to claim 15, further comprising masking all data having a zero weight.

20. The computer system according to claim 15, further comprising:
   program instructions to categorize a first portion as new;
   program instructions to request user input regarding a content category of the first portion;
   program instructions to receive a user response; and
   program instructions to update the user content preference dictionary according to the user response.

* * * * *